Patented Oct. 4, 1932

1,880,433

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AZO DYE AND METHOD OF MAKING SAME

No Drawing. Original application filed July 5, 1928, Serial No. 290,699. Divided and this application filed October 4, 1929. Serial No. 397,449.

The present invention concerns the preparation of azo dyes from hydroxy-diphenyl compounds and diazo components, particularly the alkylated dyes. In a previous application, Serial No. 290,699, filed July 5, 1928, of which this is a division, I described such azo dyes and claimed those prepared by combining hydroxy-diphenyl compounds with diazotized aryl amino bodies. In the present application I shall claim the corresponding azo dyes prepared by alkylating the compounds resulting from coupling hydroxy-diphenyls with diazo components.

The aforesaid hydroxy-diphenyl compounds are phenolic in character and may be regarded as similar, for example, to the methyl-phenols or cresols, in which a phenyl, instead of a methyl, group is substituted in the benzene nucleus. Such phenyl-phenols possess the properties common to phenols in general, and are capable of reacting in similar ways. For instance they may be coupled with diazotized, or tetrazotized, aromatic amino bodies forming thereby new and valuable azo dyes. Such dyes in comparison with the corresponding phenol dyes are somewhat deeper in color, and are markedly superior with respect to fastness to light and washing.

The invention, then, consists of the new product, viz., an azo dye of the aforesaid character, together with the steps involved in making such dye hereinafter fully described and particularly pointed out in the claims, the following description setting forth but several of the various ways in which the principle of the invention may be employed.

I have found that the operation of coupling either ortho- or para-hydroxy-diphenyl with a suitable diazotized aromatic amine, or derivative thereof, may readily be carried out according to the usual methods, the resulting dyes possessing the improved properties already referred to. Further, I have also found that when the hydroxy groups of the hydroxy-diphenyl component of such azo compound is alkylated, attaching thereto an alkyl group such as methyl, ethyl or the like, the alkylated derivatives so obtained are dyes exhibiting in even greater degree the property of fastness to light and washing, as well as further improved color quality.

The alkylated azo dyes just described, upon treatment with a reducing agent, are split at the azo linkage, yielding alkylated amino derivatives of hydroxy-diphenyl compounds which in themselves are capable of being diazotized, and are starting materials for making other azo dyes. Derivatives of this character are more particularly claimed in my co-pending application, Serial No. 311,976, filed October 11, 1928.

By way of illustration the following examples are given, but it will be understood that the invention is equally applicable to the preparation of other derivatives of the character in hand.

I. Sulfanilic acid, 58 parts, is diazotized according to the usual method and coupled with 50 parts of para-hydroxy-diphenyl dissolved in 28 parts of caustic soda and 700 parts of water, the mixture being kept cool and thoroughly stirred. Common salt is added to precipitate the dye, which is an orange colored crystalline powder. The methyl ether of this compound is then made by adding to the mixture 12½ parts of caustic soda and, with stirring, 39 parts of methyl sulphate. The reaction mixture becomes warm and in a short time forms a thick precipitate. The mass is heated to about 60° C. for about 20 minutes, then cooled and the precipitate filtered and washed with salt water. The product is the sodium salt of the methyl ether of (benzene-para-sulfonic acid)-azo-(para-hydroxy-diphenyl) from which the free acid compound is obtained by treatment with a mineral acid. Both the acid and its sodium salt consist of bright orange colored crystal flakes, slightly soluble in water, which dye wool directly in orange shades, fast to light and washing. The formula of the acid is represented thus:—

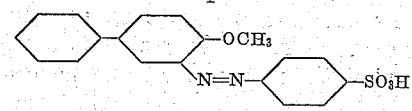

II. The analogous dye, derived from ortho-hydroxy-diphenyl by coupling with diazotized sulfanilic acid and subsequent methylation, is produced in an entirely similar manner to that described in Example I. The product has the formula:—

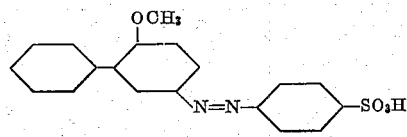

This compound is likewise a fine crystalline orange colored powder, somewhat soluble in water. Both the azo compound and the methyl ether thereof dye wool a clear orange color, distinctly deeper in shade than in the case of the para-hydroxy-diphenyl derivatives.

It is a characteristic of the dye just described, both of the azo-(hydroxy-diphenyl) compounds and of the alkyl ethers thereof, and equally of the free sulphonic acids and the salts of such acids, that they are more sparingly soluble in water than are the corresponding derivatives of other phenols, and in contradistinction of such latter derivatives, can be readily crystallized from aqueous solution in substantially pure condition, thus affording a convenient method of separating and purifying such dyes.

By similar methods related mono- and polyazo compounds can be made by coupling ortho- or para-hydroxy-diphenyl compounds with other diazotized, or tetrazotized, bodies or derivatives thereof.

Other modes of applying the principle of my invention may be employed instead of the one explained, change being made as regards the method herein disclosed, provided the steps or products stated by any of the following claims, or the equivalent of such, be employed.

I therefore particularly point out and distinctly claim as my invention:—

1. The method of making an azo dye, which comprises coupling a mono-hydroxy-diphenyl with a diazotized aromatic amino compound and alkylating the hydroxyl group of the resulting azo compound.

2. The method of making an azo dye, which comprises coupling a mono-hydroxy-diphenyl with an alkali-soluble diazotized aromatic amino compound, and alkylating the hydroxyl group of the resulting azo compound.

3. The method of making an azo dye, which comprises coupling a mono-hydroxy-diphenyl with diazotized sulfanilic acid and alkylating the hydroxyl group of the resulting azo compound.

4. The method of making an azo dye, which comprises coupling a mono-hydroxy-diphenyl with a diazotized aromatic amino compound and methylating the hydroxyl group of the resulting azo compound.

5. The method of making an ozo dye, which comprises coupling a mono-hydroxy-diphenyl with an alkali-soluble diazotized aromatic amino compound, and methylating the hydroxyl group of the resulting azo compound.

6. The method of making an azo dye, which comprises coupling a mono-hydroxy-diphenyl with diazotized sulfanilic acid and methylating the hydroxyl group of the resulting azo compound.

7. As a new product, an alkylated hydroxy-diphenyl azo dye characterized by being crystallizable from aqueous solution, and dyeing wool directly and being substantially fast to light and washing.

8. As a new product, a methoxy diphenyl azo dye characterized by being crystallizable from aqueous solution in substantially pure condition, and dyeing wool directly in orange shades substantially fast to light and washing.

9. As a new product, an azo dye having the probable formula,

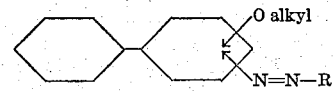

wherein R represents an aromatic residue.

10. As a new product, an azo dye having the probable formula,

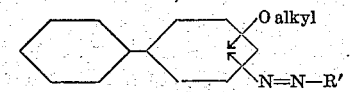

wherein R' represents an alkali-soluble aromatic residue.

11. As a new product, an azo dye having the probable formula,

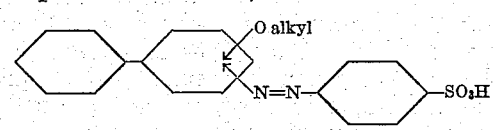

12. As a new product, an azo dye having the probable formula,

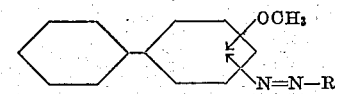

wherein R represents an aromatic residue.

13. As a new product, an azo dye having the probable formula,

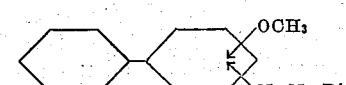

wherein R' represents a sulfonated aromatic residue.

14. As a new product, an azo dye having the probable formula,

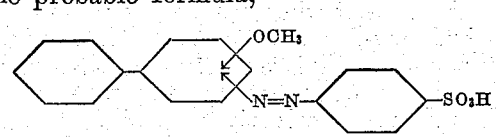

15. As a new product, an azo dye having the probable formula,

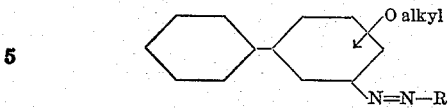

wherein the alkoxy group is ortho- or para- to the phenyl group, and R represents an aromatic residue.

16. As a new product, an azo dye having the probable formula,

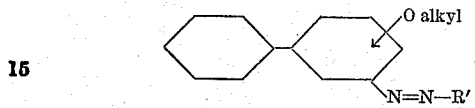

wherein the alkoxy group is ortho- or para- to the phenyl group, and R' represents an alkali-soluble aromatic residue.

17. As a new product, an azo dye having the probable formula,

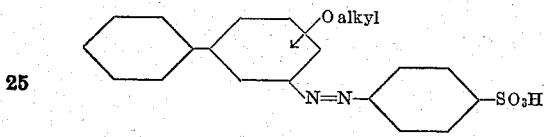

wherein the alkoxy group is ortho- or para- to the phenyl group.

18. As a new product, an azo dye having the probable formula,

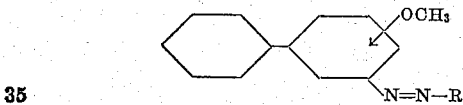

wherein the methoxy group is ortho- or para- to the phenyl group, and R represents an aromatic residue.

19. As a new product, an azo dye having the probable formula,

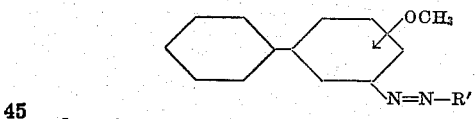

wherein the methoxy group is ortho- or para- to the phenyl group and R represents a sulfonated aromatic residue.

20. As a new product, an azo dye having the probable formula,

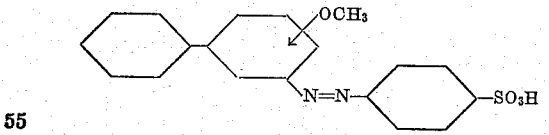

wherein the methoxy group is ortho- or para- to the phenyl group.

Signed by me this 28th day of September, 1929.

ERNEST F. GRETHER.